United States Patent
Miki et al.

(10) Patent No.: US 7,257,076 B2
(45) Date of Patent: Aug. 14, 2007

(54) MAGNETO-OPTICAL RECORDING MEDIUM

(75) Inventors: Takeshi Miki, Tokyo (JP); Goro Fujita, Tokyo (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 10/488,386

(22) PCT Filed: Jul. 4, 2003

(86) PCT No.: PCT/JP03/08536

§ 371 (c)(1),
(2), (4) Date: Sep. 13, 2004

(87) PCT Pub. No.: WO2004/006240

PCT Pub. Date: Jan. 15, 2004

(65) Prior Publication Data
US 2005/0030837 A1   Feb. 10, 2005

(30) Foreign Application Priority Data
Jul. 4, 2002   (JP) ............................. 2002-195729

(51) Int. Cl.
    *G11B 7/24*   (2006.01)
(52) U.S. Cl. .................. 369/275.4; 369/13.55
(58) Field of Classification Search ............ 369/13.55, 369/275.1, 275.4, 275.3, 283, 277, 275.2, 369/275.5, 13.52, 278, 279; 428/64.4, 64.1
See application file for complete search history.

(56) References Cited

U.S. PATENT DOCUMENTS 5,430,706 A * 7/1995 Utsunomiya et al. ..... 369/275.1
6,054,199 A * 4/2000 Sugiyama et al. ......... 428/64.1

FOREIGN PATENT DOCUMENTS

| JP | 6-302028 A | 10/1994 |
| JP | 9-17031 A | 1/1997 |
| JP | 11-120636 A | 4/1999 |
| JP | 11-213470 A | 8/1999 |
| JP | 2001-110101 A | 4/2001 |
| JP | 2001-195785 A | 7/2001 |
| JP | 2002-367249 A | 12/2002 |

* cited by examiner

*Primary Examiner*—Ali Neyzari
(74) *Attorney, Agent, or Firm*—Robert J. Depke; Rockey, Depke, Lyons LLC.

(57) ABSTRACT

A magneto-optical recording medium in which the inside of grooves formed along recording tracks is a signal recording area in groove recording, and the domain wall displacement detection method is employed; and a curvature radius R1, in the cross section perpendicular to the recording tracks, of a shoulder portion of a land separating the grooves that is adjacent to the groove is 30 nm or less and a curvature radius R2, in the cross section perpendicular to the recording tracks, of the inside edge portion of the groove for the recording that is adjacent to the land is 20 nm or more, so that a wide recording power margin can be obtained, the jitter can be improved, and the error rate can also be improved.

8 Claims, 5 Drawing Sheets

$\begin{pmatrix} R_1=68nm \\ R_2=20nm \end{pmatrix}$

Type-A $\begin{pmatrix} R_1=30nm \\ R_2=7nm \end{pmatrix}$

Type-B

MAGNETO-OPTICAL RECORDING MEDIUM

This application claims priority to Japanese Patent Application Number JP2002-195729, filed Jul. 4, 2002 which is incorporated herein by reference.

TECHNICAL FIELD

This invention relates to a magneto-optical recording medium, particularly to a magneto-optical recording medium in which, for example, grooves are formed to obtain tracking servo signals, employing a groove recording method in which a signal recording area is in the grooves and reproduction is performed by means of a so-called DWDD (Domain Wall Displacement Detection) method.

BACKGROUND ART

In magneto-optical recording media, the magneto-optical recording medium employing the DWDD method has particularly been regarded as significant, because of the capacity of high density recording. Reproduction by means of the DWDD method is performed such that thermal distribution in the magneto-optical recoding medium with irradiation of reproducing laser light causes domain wall displacement of recording marks to expand and the expanded recording marks are read out; and by doing so, recording marks are minimized to be smaller than the limit of the diameter of the spot size of the reproduction light and the high density recording is achieved.

When the above DWDD method is employed, in order to realize the magneto-optical recoding medium having a large capacity, it is necessary to realize the smooth displacement of domain walls for the improvement of the jitter and the bit error rate.

Further, in order to appropriately perform the high density recording, it is necessary to obtain the enough power margin for recording.

DISCLOSURE OF THE INVENTION

The object of the present invention is to provide a magneto-optical recording medium employing the DWDD method to perform recording in grooves, in which displacement of domain walls can be performed reliably and smoothly to reduce the jitter and the bit error rate, and at the same time, to enlarge the power margin for appropriately performing high density recording.

Namely, the present invention is the magneto-optical recording medium, in which recording is performed in grooves and reproduction is performed by means of DWDD method; and it is found that each shape of curved portions of the side edges of grooves and lands that separate the grooves affects characteristics of this medium, particularly, affects the above-described displacement of domain walls and power margin for recording, so that by specifying the shapes, the above-described object can be achieved.

Specifically, a curvature of the side edge of the land, that is, a curvature radius R1 in the cross section of the shoulder portion of the land that is adjacent to the grooves, which is perpendicular to the recording track, is set 30 nm or less, and a curvature radius R2 in the cross section, which is perpendicular to the recording track, of the side edge of the groove on which recording is performed, that is, the inside edge of the groove adjacent to the land, is set 20 nm or more.

Here, both the lower limit of the R1 and the upper limit of the R2 are respective values approximately with which concave and convex shapes and stepped differences are practically determined to obtain required tracking servo signals.

As mentioned above, according to the magneto-optical recording medium of the present invention, since the shoulder portion of the land that separates the grooves is made steep compared to that of media employing the conventional DWDD, thermal transmission to the land at the recording in the grooves, specifically, at the thermal recording with the irradiation of the laser light, furthermore thermal conduction to the other adjacent grooves over the land therebetween can be reduced, so that the cross talk at the time of the recording and the over-write are improved and the expansion of the power margin for the recording can be made; and at the same time, since the both side edges of the bottom portion of the groove are made not steep compared to that of media employing the conventional DWDD, displacement of domain walls can be performed smoothly at the time of reproduction, so that the jitter and the bit-error rate can be reduced.

THE BRIEF DESCRIPTION OF THE DRAWINGS

BEST MODE FOR CARRYING OUT THE INVENTION

An embodiment of the magneto-optical recording medium by means of the DWDD method according to the present invention will be explained.

Figure 1:
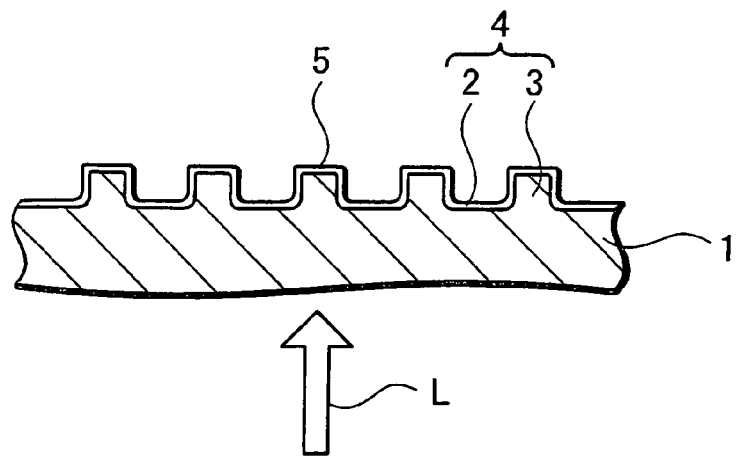
FIG. 1 is a schematic cross-sectional view showing an example of a magneto-optical recording medium according to the present invention.

The magneto-optical recording medium according to the present invention, as relevant parts of the medium are shown, for example, in a schematically cross-sectional view of FIG. 1, comprises: a recording medium substrate 1, for example, a disc substrate, on at least one main surface of which a concave and convex surface 4 provided with grooves 2 in, for example, a spiral shape or a concentric circle shape to obtain tracking servo signals and lands 3 separating the grooves 2 are formed; and on the concave and convex surface 4 a laminated film 5 having at least a recording layer and a reproducing layer respectively composed of a magnetic layer is formed.

Figure 2:
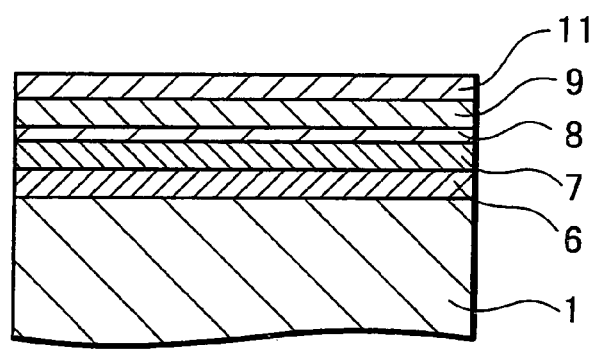
FIG. 2 is a constitutional view showing an example of formed layers including an information recording layer of the magneto-optical recording medium according to the present invention.

As shown in the cross sectional view of FIG. 2, on the recording medium substrate 1, the laminated film 5 is formed by sequentially laminating, for example, a dielectric layer 6 which is a non-magnetic layer, and a displacement layer 7 having the characteristic of low domain wall coercive force, a separating layer 8 having low Curie temperature Tc and a recording layer 9 having the characteristic of high domain wall coercive force, each of which is a magnetic layer.

Further, a protective layer 11 is formed on the laminated film 5, such that the concave and convex surface of the film is filled.

In the normal condition of this magneto-optical recording medium, the recording layer 9 and the displacement layer 7 are in the condition of magnetic exchange coupling through the separating layer 8, wherein the recording marks recorded on the recording layer 9 are transferred to the displacement layer 7.

Then, on reproduction, laser light L is irradiated for example from the rear side of the magneto-optical recoding medium substrate 1, the separating layer 8 where recording marks to be reproduced by means of DWDD, namely, by irradiation of the laser light are formed is heated up to temperature equal to its Curie temperature or higher, and the exchange coupling between the displacement layer 7 and recording layer 9 is released to displace domain walls in the displacement layer 7 along the extended direction of the grooves 2 by means of the distribution of temperature within the spot of the laser light, so that the recording marks are expanded and the necessary and sufficient reproduction signal output can be obtained. In this manner, since the recording marks are expanded on reproduction, the recording marks themselves can be miniaturized, thereby enabling the high density recording to be performed.

Figure 3:
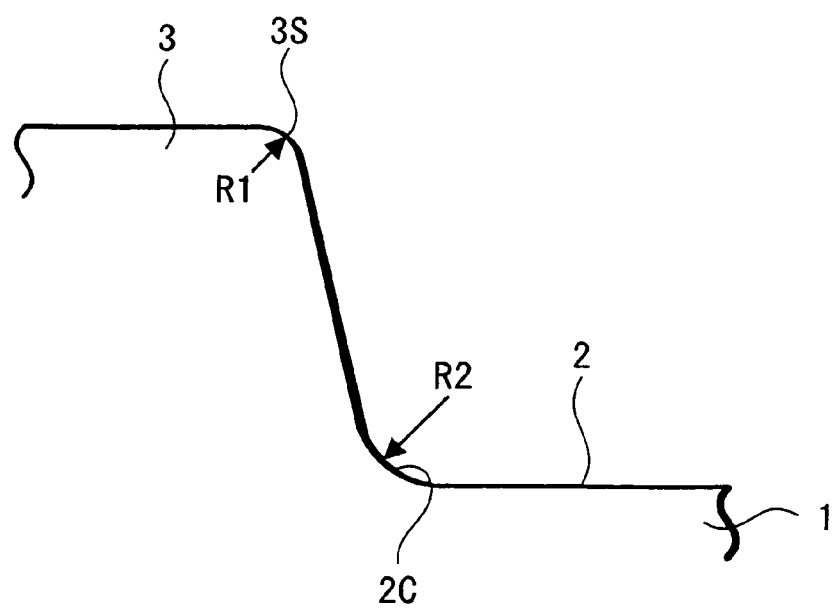
FIG. 3 is a schematic cross-sectional view showing the relevant part of the structure provided to explain the shape of a substrate of the magneto-optical recording medium according to the present invention.

Further, in the magneto-optical recording medium according to the present invention, as shown in the cross sectional view of the groove 2 and adjacent land 3 in FIG. 3, curvature radius R1, in the direction perpendicular to recording tracks that is perpendicular to the extended direction of grooves, of a curved portion, that is, a shoulder portion 3S of the land 3 which is adjacent to the groove 2, and curvature radius R2, in the direction perpendicular to recording tracks that is perpendicular to the extended direction of grooves, of a curved portion, that is, the inside edge portion 2C of the groove 2 which is adjacent to the land 3 are respectively specified.

Specifically, the curvature radius R1 is set to 30 nm or less, and the curvature radius R2 is set to 20 nm or more.

Further, as mentioned above, both the lower limit of R1 and the upper limit of R2 are practically determined as values approximately with which the shape and stepped differences to obtain required tracking servo signals are obtained.

In order to clarify the characteristics of the magneto-optical recording medium according to the present invention, magneto-optical recording media of type-A and type-B are prepared.

In type-A, the curvature radiuses R2 of both the side edges 2C of the groove 2 are set to 20 nm, and the curvature radius R1 of the shoulder portion 3S of the land 3 is set to 69 nm.

Also, in type-B, the curvature radius R1 of the shoulder portion 3S of the land 3 is set to 30 nm, and the curvature radiuses R2 of both the side edges 2C of the groove 2 are set to 7 nm.

Figure 4A:
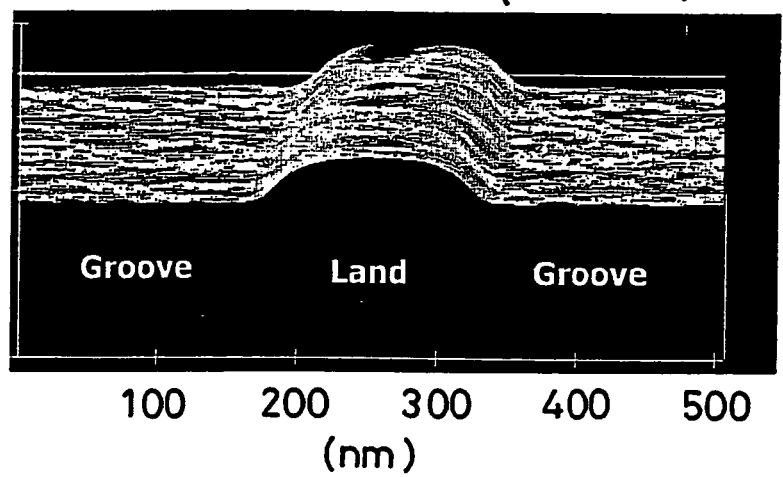
FIGS. 4A and 4B are schematic perspective views showing the lands and grooves of type-A and type-B in enlarged scale illustrated based upon the ATM (Atomic Force Microscope) photographs.
Figure 4B:
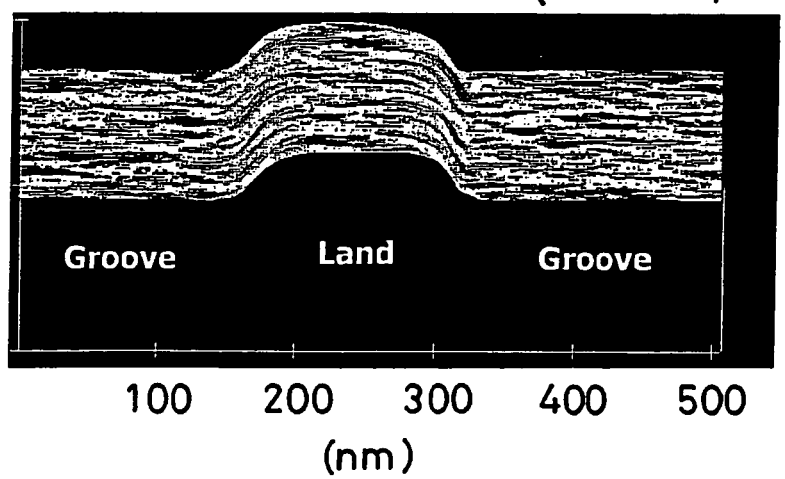

FIGS. 4A and 4B are the schematic perspective views of lands and grooves of the recording medium substrates 1 of the type-A and type-B that are drawn based upon AFM (Atomic Force Microscope) photographs.

Each of the magneto-optical recording media of those type-A and type-B, comprises the substrate 1 composed of polycarbonate of 0.6 mm in thickness, on which a dielectric film made of an SiN film of 40 nm in thickness, a displacement layer made of a GdFeCo film of 40 nm in thickness, a control layer made of a TbFeCo film of 3 nm in thickness, a separating layer made of a TbFeCoAl film of 10 nm in thickness, a recording layer made of a TbFeCo film of 50 nm in thickness, a recording auxiliary layer made of a GdFeCo film of 10 nm in thickness, a dielectric layer made of an SiN film of 30 nm in thickness, and a reflective film or temperature control film made of an Al alloy film of 300 nm in thickness are formed sequentially.

Here, the control layer functions as a layer that controls displacement of the domain walls to reduce noise at the time of reproduction, and the recording auxiliary layer is a layer to enhance the sensitivity to the magnetic field at the time of recording.

Figure 5A:
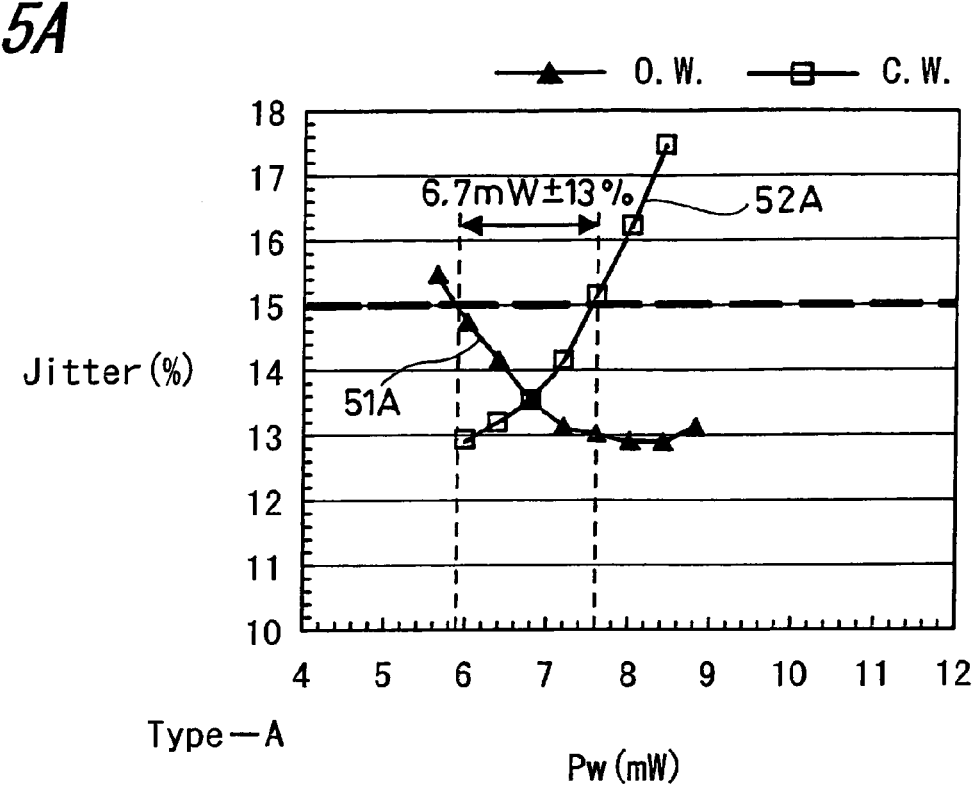
FIGS. 5A and 5B are diagrams showing the measurement results of a margin of the magneto-optical recording medium using the substrates shown in FIGS. 4A and 4B, respectively.
Figure 5B:
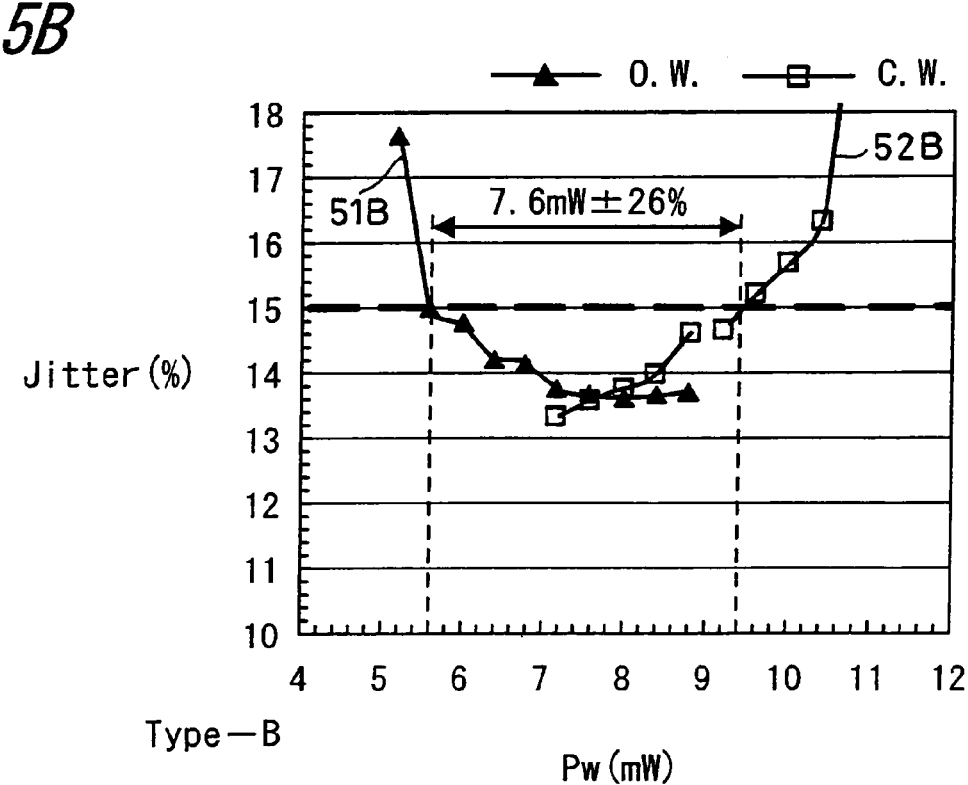

The measurement results of recording power margin of the magneto-optical recording media of the type-A and type-B are shown in FIGS. 5A and 5B, respectively.

In this case, the track pitch of 0.44 µm, the pit length of 0.09 µm, and the duty ratio of the recording pulse of 33% are each set.

Characteristic curves 51A and 51B in FIGS. 5A and 5B, respectively are the curves in which measurement results of jitter of the reproduction signals of a main groove are plotted, in the case where data recording is respectively performed on the main groove and on adjacent grooves next to the main groove and over writing (O. W.) of another recording data is performed onto the data written in the main groove.

Further, characteristic curves 52A and 52B are the curves in which, first, data recording is performed on the main groove, and subsequently the data recording is performed onto both the adjacent grooves, and then returned to the main groove and jitter is measured to plot the results thereof. Accordingly, in this case, influence caused by the recording onto the next groove, namely, cross write (C.W.) is measured.

Here, if the jitter of 15% or lower is allowable, in the type-A, the range in which both the jitters of 51A and 52A become 15% or lower is approximately 6.7 mW±13%, compared with that, the range thereof with respect to 51B and 52B is 7.6 mW±26%, so that the recording power margin is expanded in the type-B.

Specifically, in the type-B in which the shoulder portion 3S of the land 3 has a steeper slope of 30 nm than conventional ones, the recording power margin is expanded compared with the type-A in which the shoulder portion 3S of the land 3 has a gentle slope.

It is understood that when the curve of the shoulder portion 3S of the land 3 is steep, the heat caused by irradiating the groove 2 with laser light at the time of recording is not easily diffused over the land. Therefore, as the improvement of the recording density may be attempted and the track pitch is getting narrower than now, the curvature radius of the shoulder portion 3S of the land 3 is desired to be smaller than 30 nm of type-B. In other words, the inside angle of this shoulder portion 3S may be smaller than 90°.

However, with respect to jitter bottom, the type-A is lower than the type-B. This is considered that in the type-A, because the curvature radiuses R2 of both the edge portions 2C of the groove 2 are set to 20 nm with gentle curve compared with the type-B in which the curvature radius R2 is 7 nm, displacement of the domain walls of the recording marks can occur easily at the time of reproduction. Thus, in order to lower the jitter bottom, it is desirable for the curvature radiuses of both the edge portions 2C of the groove 2 to be set to at least 20 nm or more.

As a result, in the construction according to this invention, in the magneto-optical recording medium substrate 1 by means of the DWDD the curvature radius R1 of the shoulder portion 3S of the land 3 is selected to be 30 nm or less, and the curvature radiuses R2 of both the edge portions 2C of the groove 2 is at least 20 nm or more.

Next, an example of a method for manufacturing a magneto-optical recording medium having the curvature radius R1 of the shoulder portion 3S of the land 3 and the curvature radiuses R2 of both the edge portions 2C of the groove 2 according to the present invention is explained referring to FIGS. 6 through 8.

In this case, the concave and convex surface 4 having the groove 2 where the tracking servo signals are obtained at the time of recording and reproducing and the land 3 that separates those grooves is formed in the magneto-optical recording medium substrate 1, and the concave and convex surface 4 is formed such that, similarly to a conventional method, when the substrate 1 is injection-molded out of plastics such as polycarbonate, with placing the stamper that has the inverted concave and convex surface 4 in a mold cavity to integrally form the concave and convex surface 4 with the formation of the substrate 1.

Alternatively, the concave and convex surface 4 is formed by the so-called 2P (Photo Polymerization) method, in which the substrate 1 is coated with ultra-violet curing resin to form a resin layer, onto which a stamper having the inverted concave and convex surface 4 is pressed to transfer and form the surface 4, and then ultra violet ray is irradiated to cure the resin.

In this method, processes for fabricating the master of this stamper are employed. A method for manufacturing the stamper is explained referring to process views in FIGS. 6 and 7.

Figure 6A:
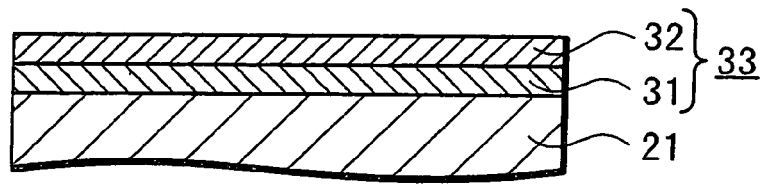
FIGS. 6A through 6E are process diagrams showing an example of steps of a method for manufacturing the magneto-optical recording medium according to the present invention.

First, as shown in FIG. 6A, a substrate 21, for example, a glass substrate having a plane surface to form the master is provided, and the plane surface of the substrate is coated with a laminated resist layer 33 comprising a lower resist layer 31 formed of, for example, Si-based photo-resist and an upper resist layer 32 formed of, for example, novolak-based photo-resist.

Figure 6B:
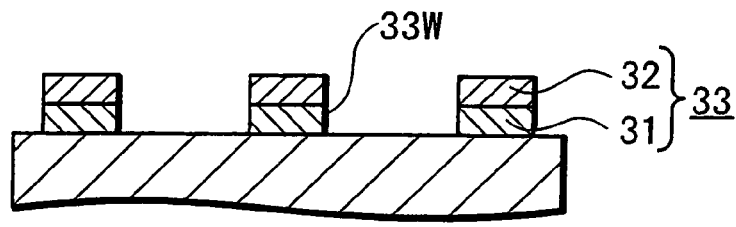
Figure 6C:
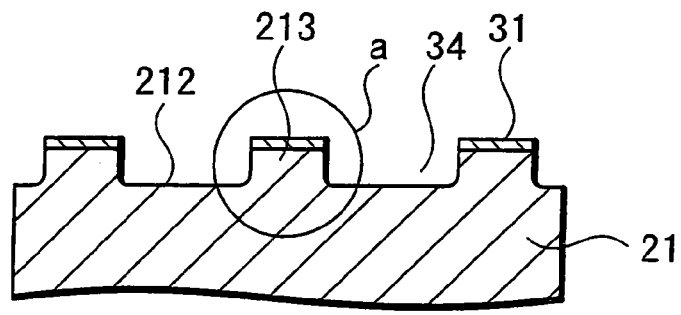

As shown in FIG. 6B, electron beam lithography or pattern exposure by optical exposing is performed onto the laminated resist layer consisting of the lower resist layer 31 and upper resist layer 32, and development processing is performed to form openings 33W at the portions where grooves of the above aimed concave and convex surface 4 are formed. RIE (Reactive Ion Etching) is performed from the upper side of the laminated resist layer 33, and as shown in FIG. 6C, when the upper resist layer 32 is etched, the surface of the substrate 21 that exposes to the outside through the opening 33 is etched at the same time.

Then, oxygen plasma processing is performed. With this, as shown in enlarged scale in FIG. 8A, a portion marked with a circle a in FIG. 6C remains with the resist layer 31 of a small etching rate, and in the portion where the opening 33W is formed the oxygen plasma processing is performed under the condition of the concave portion being formed, so that in a convex portion 213, a shoulder portion thereof becomes steep and in a concave portion 212, the side edge thereof having a gentle curve is formed.

Figure 6D:
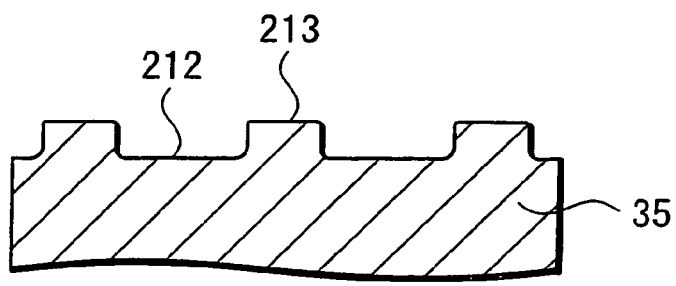
Figure 8A:
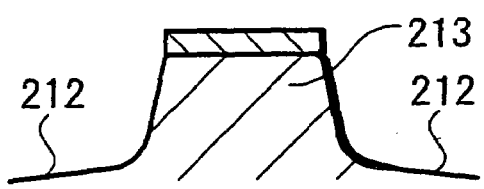
FIGS. 8A and 8B are enlarged cross-sectional views showing the relevant parts of FIGS. 6C and 6D.
Figure 8B:
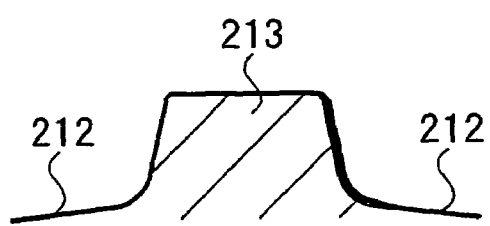

Subsequently, as shown in FIGS. 6D and 8B, the resist layer 33 is dissolved and removed. As described above, the concave portion 212 having the shape and depth corresponding to the aforementioned groove 2, and the land 213 corresponding to the land 3 that separates the concave portions 212 are formed. Consequently, a master 35 for manufacturing the stamper is formed.

Figure 6E:
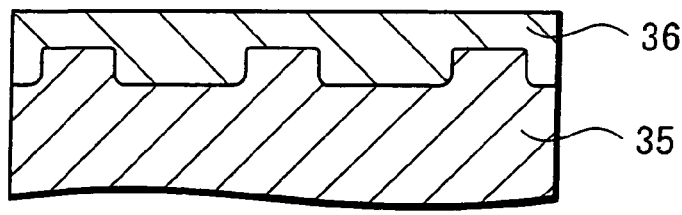

As shown in FIG. 6E, a nickel plating layer 36, for example, is formed on the master 35 by electroless plating and electrolytic plating, for example.

Figure 7A:
FIGS. 7A and 7B are process diagrams showing the subsequent steps to those shown in FIG. 6.

As shown in FIG. 7A, the plating layer 36 is removed from the master 35, and the stamper 36 with the concave and convex surface having an inverted pattern of the master is obtained. Alternatively, using the above as a master stamper, the stamper 36 is formed by repeating similar plating and removing processes.

Figure 7B:
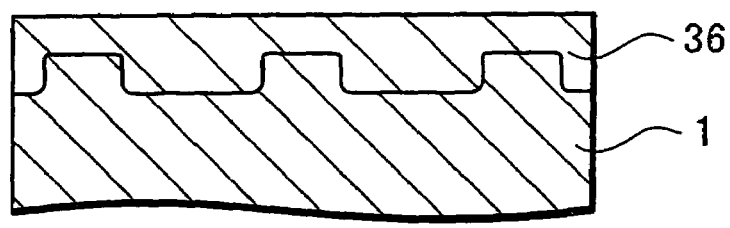

Then, as shown in FIG. 7B, using the stamper 36 in the 2P method or the injection molding, the aimed magneto-optical recording medium 1 having the concave and convex surface 4 provided with the grooves 2 and lands 3 is obtained.

Accordingly, the substrate 1 having the above requiring concave and convex surface 4 in which the land 3 that has the shoulder portion 3S with the small curvature radius R1 and the groove 2 that has the side portion 2C with the large curvature radius R2 are formed is provided. Further, curvature radiuses R1 and R2 can be determined as $R1 \leq 30$ nm and $R2 \geq 30$ nm respectively by selecting conditions of the above mentioned RIE and oxygen plasma processing, for example, by selecting processing time and others.

Then, with forming the coating layer 5 having the film structure shown in, for example, FIG. 2 on this substrate 1, the magneto-optical recording medium is obtained.

As mentioned above, according to the magneto-optical recording medium by means of the DWDD of the present invention, the curvature radius R1 of the shoulder portion 3S of the land 3 and the curvature radius R2 of the both edge portions 2C of the groove 2 are specified, so that a wide recording power margin can be obtained, the bottom jitter can be low, and the error rate can be improved.

Furthermore, according to the manufacturing method of the present invention, by performing RIE for the laminated resist layer 33 that has the resist layer 31 with the small etching rate in its lower layer, the magneto-optical recording medium of the present invention can be manufactured without increase in production processes.

Although in the above described embodiment the photo-resist layer is formed by laminating two layers of the lower and upper thereof, for practical purposes, since the groove has the shallow depth of approximately 35 nm, the following method can be used in which the single resist layer is employed, RIE is performed and the single resist layer remains with the required thickness, and then the oxygen plasma processing is performed.

The invention claimed is:

1. A magneto-optical recording medium in which the inside of grooves of recording tracks is a signal recording area, and the domain wall displacement detection method is employed, wherein a curvature radius R1, in the cross section perpendicular to said recording tracks, of a shoulder portion of a land separating said grooves that is adjacent to said groove is 30 nm or less, and a curvature radius R2, in the cross section perpendicular to said recording tracks, of the inside edge portion of said groove for said recording that is adjacent to said land is 20 nm or more; and a laminated film including at least a magnetic layer formed over the grooves having a shape corresponding to the radius of curvature for the shoulder portion and inside edge portion of said groove.

2. A magneto-optical recording medium according to claim 1, wherein on at least one main surface of a recording medium substrate, a concave and convex surface where said lands and grooves are formed is made, and on said concave and convex surface, a laminated film including at least a magnetic layer formed with the surface that retains the shape of said concave and convex surface is formed.

3. A magneto-optical recording medium according to claim 1, wherein the curvature radii R1 and R2 are set such that R2≠R1.

4. A magneto-optical recording medium according to claim 3, wherein the curvature radii R1 and R2 are set such that R2>R1.

5. A magneto-optical reproducing system comprising:

a magneto-optical recording medium having a concave and convex surface and a laminated recording film;

a magneto-optic reproducing head for reproducing data recorded in the magneto-optical recording medium via a domain wall displacement detection method; and wherein the inside of grooves formed along recording tracks comprises a signal recording area, wherein a curvature radius R1, in the cross section perpendicular to said recording tracks, of a shoulder portion of a land separating said grooves that is adjacent to said groove is 30 nm or less, and a curvature radius R2, in the cross section perpendicular to said recording tracks, of the inside edge portion of said groove for said recording that is adjacent to said land is 20 nm or more.

6. The magneto-optical reproducing system according to claim 5, wherein the curvature radii are set such that R2≠R1.

7. The magneto-optical reproducing system according to claim 6, wherein the curvature radii R1 and R2 are set such that R2>R1.

8. The magneto-optical reproducing system according to claim 5, wherein the curve of the shoulder portion of the land is made steep in order to improve the diffusion of heat caused by irradiation of the groove with a laser beam, and wherein the curve of the inside edge portion of the groove is made gradual in order to lower jitter.

* * * * *